April 25, 1933.    B. R. BRIERLY    1,905,338
CANNED FISH PACKAGE AND PROCESS OF PREPARING THE SAME
Filed Oct. 20, 1928
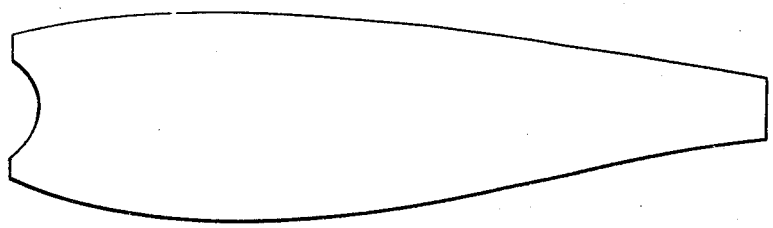
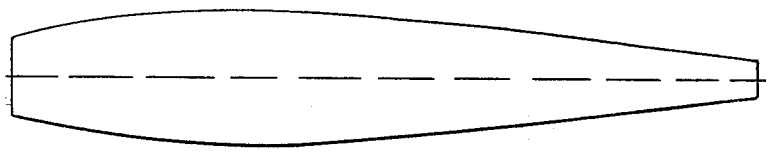
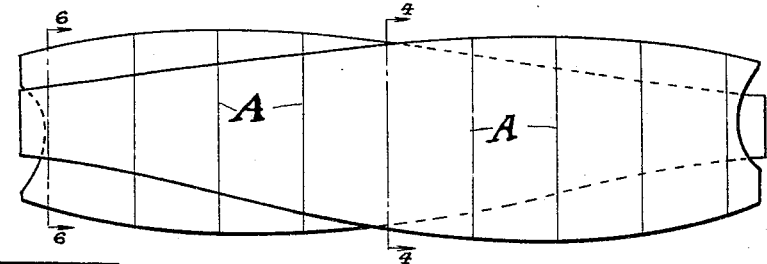
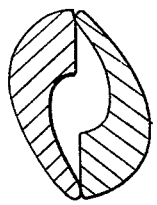
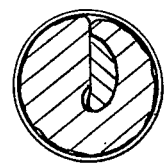
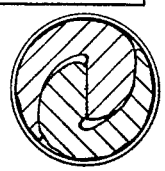
Inventor
Benjamin R. Brierly
By Reynolds & Reynolds.
Attorneys Patented Apr. 25, 1933

1,905,338

UNITED STATES PATENT OFFICE

BENJAMIN R. BRIERLY, OF SEATTLE, WASHINGTON

CANNED FISH PACKAGE AND PROCESS OF PREPARING THE SAME

Application filed October 20, 1928. Serial No. 313,720.

My invention relates to the method of handling the fish preparatory to and while placing it in cans, and to the package formed under this method.

The object of my invention is to produce a package of canned fish which is an improvement upon the usual and preceding packages, both in its edible qualities and in its appearance, and to provide a method of handling the fish for placing in the can which will produce these results.

The accompanying drawing shows a fish and the manner of treating and handling it to secure the desired results.

Figure 1 is a side view and Figure 2 a top view giving a typical outline of a fish, namely a salmon, which is largely used for canning.

Figure 3 shows how the halves of such a fish are placed in one stage of my process.

Figure 4 is a cross section of two halves taken through the middle portion of their length and Figure 5 how these would look when inserted in a can.

Figure 6 shows a section taken near one end of the fish, and Figure 7 the same in a can.

Figure 8 shows a filled can where the fish were of a smaller size, which required the use of more than two sections to fill the can.

Salmon, which constitute the major part of the canned fish product of the country, are characterized by having a greater oil content near the head and in the belly sections, while the tail sections are much drier than the rest. It would therefore follow that a can containing only parts taken from the head end would be more oily and richer than one filled from other parts of the fish, while one which contained only tail sections would be much drier and would also have a much larger percentage of bone.

In the methods customarily followed nothing is done to average up these conditions or to contribute towards uniformity in quality of the contents of all the cans. While hand filling of the cans would make it possible to somewhat average the quality of the can contents, working conditions, and the requirement for speed tend to largely nullify such possibilities. Where machine filling of the cans is used, the conditions referred to exist at a maximum. Whether machine or hand filling methods are employed, the invariable practice has been to cut the whole fish only crosswise and into lengths suitable to fit the cans.

In my present invention I propose to slit each fish through or close alongside of its back bone, forming two symmetrical halves, which halves are reversed in position, the head end of one half being opposite the tail end of the other, as is shown in Figure 3. Exact matching of the two halves lengthwise thereof I do not consider essential, although it may be desirable. Neither do I consider it essential that the inner or flesh sides of the two halves be placed together, although this appears to have some advantages. My invention contemplates placing any face surfaces of the halved fish together.

I do not consider it essential that the fish be slit longitudinally into two halves only; it may in some cases be desirable to slit it longitudinally into three or more pieces, and so long as there is a longitudinal division of the fish and a reversal, end-for-end, of the pieces thus formed, it is deemed to be within the purview of my invention.

My invention appears to be more advantageously applicable to a system of machine filling of cans, although it is not limited thereto. Under my present system, the fish, after slitting longitudinally into halves, quarters, or the like, and the end-for-end reversal of the halves, are in some fashion cut transversely, as at A, to fit the cans. The transverse cuts may be made by hand or by machines, and the cuts may be severed one at a time or all at one time; these details form no part of my invention. For use with one type of filling machine the fish, after slitting lengthwise and the end-for-end reversal of the longitudinal sections, are fed to the filling tube, usually termed the "measure box," and are cut transversely as inserted into the cans. In some cases two halves will be of such size that they will completely fill the can, as is shown in Figure 5. Where the fish are smaller, more than two halves will be required, as is indicated in Figure 8.

Figure 4 indicates by cross-section the relative condition of the two halves at about the middle of the length of the fish, while Figure 6 shows their relation at or near to their ends. Figures 5 and 7 show their relation when inserted in a can. Figure 8 illustrates the condition when the fish are small enough to require more than the two cuts to fill the can.

Under this plan of operating, every tail section in a can is balanced by a section cut from near the head. It is often surrounded and hidden by the larger head section, so that when discharged from the can it presents an attractive appearance. The difference in oil content of such different cuts is balanced, thereby providing a product of more desirable and uniform quality, therefore one of higher sales value.

The term "lengthwise," as herein applied to the cans, means in the direction of the axis of the cylinder formed by the cans, and as applied to the fish and fish sections means substantially that of the back bone.

The reversal of the halves of the fish herein contemplated is that which reverses the relative positions of the head and tail ends, irrespective of any reversal of the side faces which does not reverse the ends.

The cuts of fish made up in this manner are so nearly uniform in thickness, that is, there is no small tail piece, that cross-filling of cans, heretofore objectionable and lowering the value of the pack, will be eliminated. Further, no one can now receive the entire gill bone, in canneries where the gill cut is still employed, or the entire tail piece, since the gill bone and the tail are divided into two pieces at least, and the two halves are placed at opposite ends before cutting transversely.

What I claim as my invention is:

1. The process of preparing fish for canning which consists in slitting the fish lengthwise, placing the parts produced by said slitting alongside each other in lengthwise reversed relation, and cutting said assembled parts transversely into lengths suited to the depth of the cans.

2. The process of filling cans with fish which consists in slitting the fish lengthwise, reversing the relative position of the parts thus formed, and feeding them to the filling machine in such reversed positions.

3. The process of preparing fish for canning which consists in slitting the fish lengthwise and turning the parts thus formed, and placing them alongside each other in reversed endwise relation.

4. A package of canned fish containing longitudinally severed sections of fish placed side by side with the axes thereof extending lengthwise of the can, and with the sections placed in reversed positions relative to their lengthwise relation when in the fish.

5. The process of preparing fish for canning which includes the steps of dividing the fish lengthwise into two or more parts, and placing the tail piece of one such part alongside the neck piece of another part.

6. The process of preparing fish for canning which includes the steps of dividing the fish lengthwise into two or more parts, and disposing the tail piece of one such part longitudinally spaced from the tail piece of another such part.

7. The process of preparing fish for canning which includes slitting the fish lengthwise into a plurality of strips, and placing the strips thus formed alongside each other with certain parts thereof reversed in end-for-end positions, so that any transverse section cut from the assembled strips will possess substantially the same food characteristics as any other transverse section.

Signed at Seattle, Washington this 10th day of October 1928.

BENJAMIN R. BRIERLY.